Dec. 27, 1966     N. H. WENT     3,294,287
VIBRATORY FEEDER
Filed Sept. 18, 1964     2 Sheets-Sheet 1
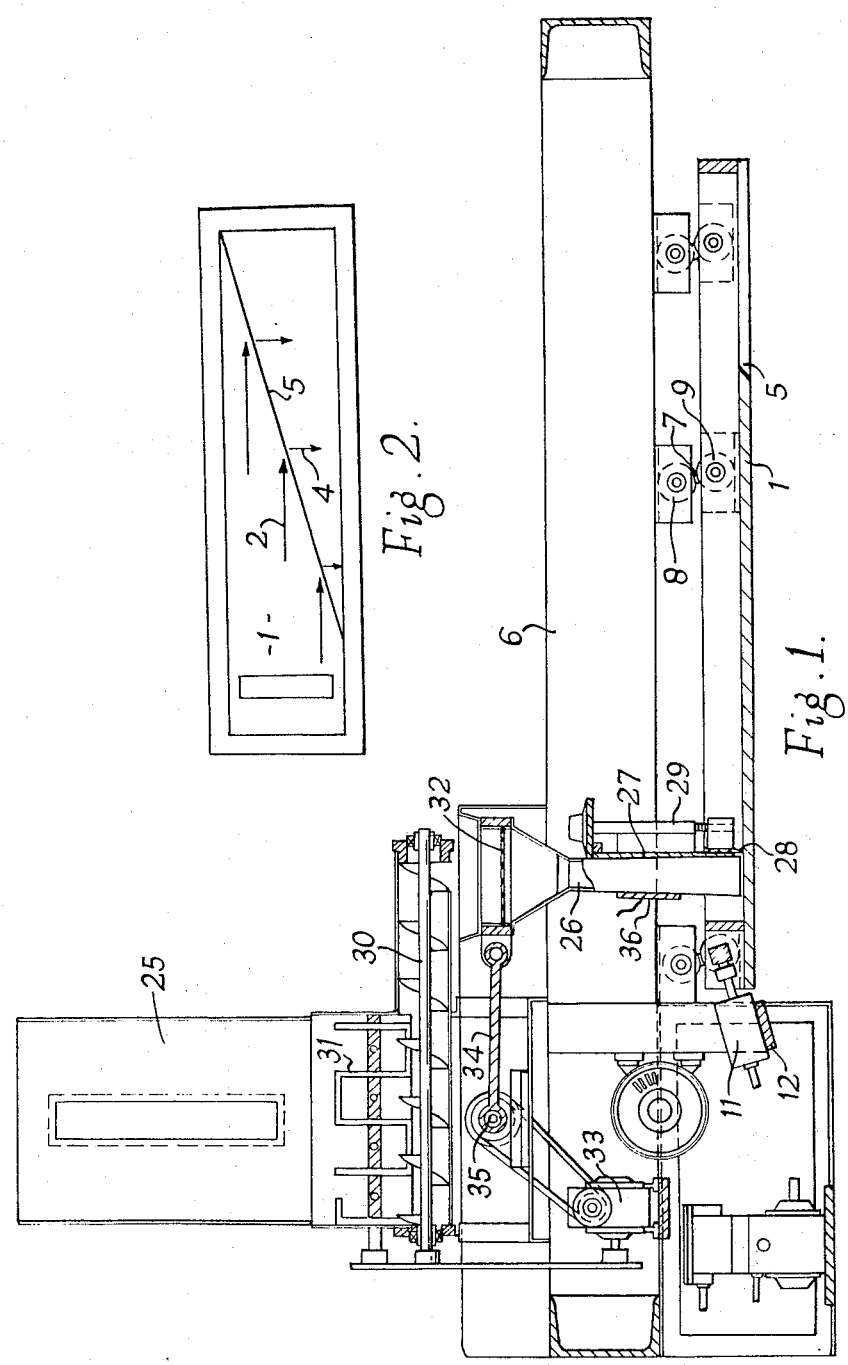
INVENTOR
Norman Henry Went
BY
Wenderoth, Lind and Ponack
ATTORNEYS Dec. 27, 1966   N. H. WENT   3,294,287
VIBRATORY FEEDER Filed Sept. 18, 1964   2 Sheets-Sheet 2

INVENTOR
Norman Henry Went

BY
Wenderoth, Lind & Ponack

ATTORNEYS

United States Patent Office 3,294,287
Patented Dec. 27, 1966

3,294,287
VIBRATORY FEEDER
Norman Henry Went, London, England, assignor to Staflex International Limited, London, England, a British company
Filed Sept. 18, 1964, Ser. No. 397,471
Claims priority, application Great Britain, Sept. 20, 1963, 37,084/63
4 Claims. (Cl. 222—55)

The present invention relates to feeders which are intended for use in the accurate and consistent distribution of a free flowing granular material, over a large width and at delivery rates which can be varied over a wide range.

Vibratory feeders and vibratory spreaders have been proposed which are driven either electro-magnetically or mechanically, but it has been found that their feed rates are frequently far in excess of the relatively low feed rates which are required for some spreading or distributing operations, such as the distribution of granular polyethylene or other synthetic resin on a fabric substrate in the manufacture of fabrics for use as an interlining, which can be fused to a facing fabric in the manufacture of garments. Generally also the width of known feeders and spreaders is limited and have been too narrow for some purposes.

Disadvantages also exist in the use of electro-magnetic devices, in that mains supply voltage changes cause a change of feed rate due to a variation of amplitude of vibration and these disadvantages can only be overcome at high cost. Usually with such feeders a long supply hopper is used when it is desired to feed granular material over a substantial width and this results in difficulty in controlling the level of granular material therein and hence in controlling the weight of material on the vibrating tray. Difficulties exist also in controlling the settings of the feed gates, which may easily become clogged when the hopper is wide and the feed rate is low. Furthermore when the hopper extends over the full width of the delivery section the feed gate must be set very low and very accurately controlled. Small variations in feed gate settings have been found to result in very large changes in the feed rate.

Electrical control has in the past been, for example, by way of a "Variac" unit, this control being extremely sensitive, but subject to variation.

Where a long tray for the material to be fed is used it has been found to be particularly susceptible to "end wag" which has to be overcome by the use of two or more power units. In addition to these considerations, with the usual restriction that a mains supply has to be used with a frequency of 50 cycles per second, a relatively high energy of vibration results, which increases the risk of spurious oscillations, which prevent uniform rate of distribution of the granular material.

Direct mechanical vibrators have been found to be noisy and, as a result of their push-pull action, bearings and pushers associated therewith tend to wear rapidly, thus giving rise to spurious vibrations. It is an object of the present invention to overcome or to reduce the disadvantages hereinbefore mentioned.

Broadly the present invention consists in a vibratory feeder for a granular material comprising a substantially horizontal feed tray, which is bodily vibratable at a small angle of inclination to the horizontal. Preferably the tray is provided with a feed edge, which extends at an angle of considerably under 45° to the centre line of the tray, so that the distance between the two ends of the feed edge, measured longitudinally of the tray is considerably in excess of its width. A web of material moved under the feeder at right angles to the length of the vibrating tray may thus have a granular material deposited thereon from a vibrating tray, which is much narrower than the web itself. The tray itself is preferably supported by a series of parallel links, the ends of which are mounted in torsion bushes, made of rubber-like material and mounted respectively in sockets in the frame of the machine and the tray, these links extending at a small angle to the vertical, so that when the tray is displaced from a rest position against the restoring force provided by the bushes, the tray remains parallel to its original position and moves bodily in a direction at a small angle to the horizontal. Advantageously the vibrating force is supplied mechanically by a hydraulic pump and cylinder system.

The vibration of the tray is preferably effected by means of a reciprocating pump which supplies fluid to a hydraulic cylinder unit, which is in driving connection with the tray. The frequency of vibration of the tray depends on the stroke or pulse frequency of the pump. The amplitude of the tray vibration may be varied by by-passing a portion of the pump output back to the pump inlet and this arrangement is suitable for automatic control by a continuous measuring system for measuring the mass of powder delivered by the feeder. A nucleonic thickness gauge, such as Type N565A supplied by Ekco Electronics Limited or other suitable mass or weight measuring device may be used for this purpose and the signals arising from variations in the feed rate may be fed back to a servomotor, which controls the setting of a bleed valve in the pump by-pass line. Preferably the pump is driven by a constant speed motor of the known type which is relatively insensitive to changes of mains voltage within the range which is commonly experienced. Some form of change speed device is preferably provided between the drive motor and the pump.

Granular material is preferably fed to the tray by a hopper, which is effective to maintain a column of granular material supported on the tray. Advantageously the ratio of the width of the hopper, which controls the width of the layer of granular material on the tray, and the feeding edge of the tray is in the order one to five. Preferably the feed hopper is tapered so that the mouth of the hopper is smaller than its distal end, thereby to reduce clogging, caking or bridging.

Conveniently the feed hopper is supplied with material from a bulk supply hopper of larger capacity. The material may be fed from the bulk supply hopper to the feed hopper by means of a feed screw and an oscillating sieve. Advantageously the level of material in the feed hopper is controlled by a device, such as a Fielden Tektor Type TT5, supplied by Fielden Electronics Ltd., sensitive to the level of granular material in the feed hopper and adapted to generate a signal which may be fed back to control the motor, which drives the feed screw of the bulk hopper. Advantageously the material is metered from the feed hopper by an adjustable doctor blade, carried on the front of the feed hopper and positioned very close to the surface of the vibrating tray.

The feed hopper and the attached doctor blade are rigidly suspended from a main support frame which is isolated from external vibration. The vibrating tray is mechanically isolated from all other parts of the device, excepting of course the means utilised for generating vibrations, such as the pump and hydraulic cylinder already referred to.

One embodiment of the present invention is illustrated in the accompanying drawings wherein FIGURE 1 is a side view of a feeder, partly in section on the centre line of the vibrating tray;

FIGURE 2 is a diagrammatic plan view, showing the shape of the vibrating tray;

Figure 4:
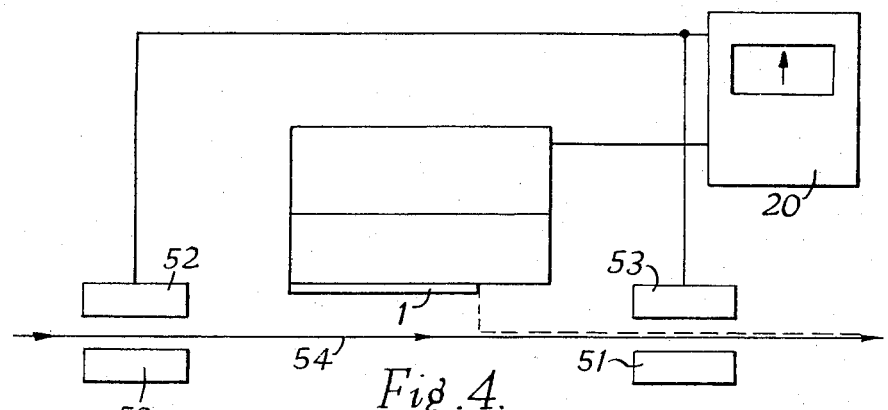
FIGURE 4 illustrates one method of controlling the feed rate.

The feeder shown in FIGURE 1 is designed to distribute accurately and consistently a free flowing granular resin or other powdered material over a large width at varying rates of delivery. The width of the distribution is in the order of 3 to 15 feet.

The material is distributed by means of a vibrating tray 1, which oscillates in the direction of the arrows 2 in FIGURE 2 and is constructed of light aluminium alloy plate. The construction of the tray is such that it is as rigid and as light as is possible, being, for instance of "Honeycomb" sandwich or like structure. The vibrating tray 1 is utilised, for example, to distribute granular polythene on to a fabric web travelling in the direction of the arrows 4 in FIGURE 2.

The tray 1 is formed with a distribution edge 5, which extends at a small angle, say 10–30°, to the centre line of the vibrating tray, so that the width of the moving fabric web may be several times greater than the width of the vibrating tray. The tray 1 is supported from a main support frame 6 by a series of parallel links 7, the upper and lower ends of which are respectively mounted in torsion brushes 8, carried by the frame 6, and torsion bushes 9 carried on the tray 1, so that it is free to move in only one plane.

The torsion bushes are of conventional construction, having inner and outer concentric metal bushes bonded to each other by an annular layer of rubber, so that when the tray 1 is displaced from the rest position shown in FIGURE 1, the natural resiliency of the rubber will tend to restore the tray to its original position.

It is a principle of the operation of the feeder that the tray 1 is vibrated bodily at an angle to the horizontal, preferably between 10–25°.

The links 7 and the torsion bushes 8 and 9 are therefore arranged so that the links are at a corresponding angle, preferably 10–25°, to the vertical. Within the small angle of displacement imparted to the tray 1, its movement may be considered as being linear.

The granular material which is fed onto the tray 1 is moved along the tray in a series of small hops by vibrating the tray.

Figure 3:
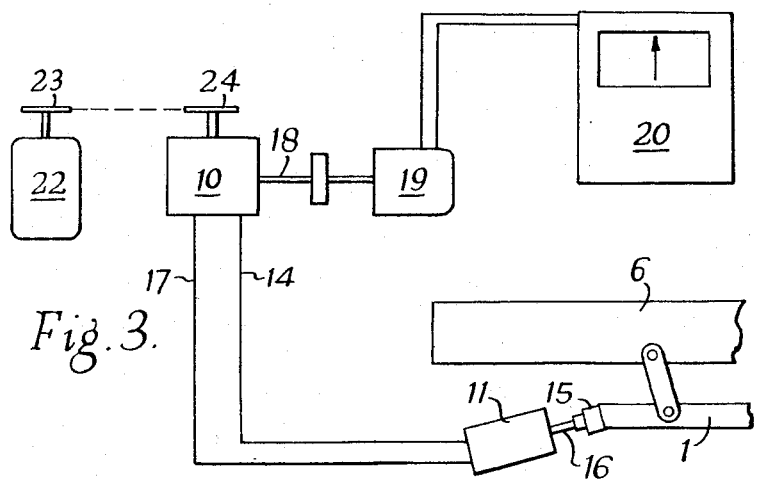
FIGURE 3 illustrates the hydraulic system for vibrating the tray.

The tray 1 is vibrated by means of a hydraulic pump and cylinder system (FIGURE 3) which operates against the torque produced in the supporting torsion bushes 8 and 9.

Hydraulic fluid is supplied from a reciprocating pump 10 to a hydraulic cylinder 11, carried on a frame member 12 of the machine. The piston in the cylinder 11 is connected to the tray 1 through a connection having some degree of flexibility. A pulse of fluid is supplied on the thrust stroke of the pump to the cylinder 11 and, during the return stroke of the pump, the resilience of the torsion bushes is effective to move the cylinder piston in the reverse direction to force hydraulic liquid back through a return line to the pump reservoir.

In order to be able to control the quantity of material fed by the vibrating tray 1, means are provided for controlling the amplitude of vibration of the tray 1 by variation of the volume of liquid delivered to the hydraulic cylinder 11 at each stroke of the pump 10.

Many forms of variable output reciprocating pumps are known. For ease and accuracy of control the pump 10, shown in FIGURE 3, fluid is supplied to the cylinder 11 through a flow line 14. On the return stroke the tray 1 pushes against a rubber pad 15, connected to the piston rod 16 of the cylinder 11 to force fluid back through a return line 17 to the pump reservoir.

The pump 10 is of a known type provided with a bleed valve on the output side, which bleeds fluid directly back to the pump reservoir in an amount dependent upon the angular position of a rotatable spindle 18. In the present construction the spindle 18 is rotated by a servo motor 19, which receives feed-back signals from a nucleonic gauge 20. The gauge 20 is an apparatus, known per se, utilized for measuring the amount of material supplied by the vibrating tray 1 and its operation is described more fully below. By the use of the gauge 20 and servo motor 19, the output of the pump 10 may be controlled automatically to maintain the feed rate substantially constant within quite narrow limits as compared with known vibratory feeders, the feed rate of which may vary 25% or more, at least at low feed rates.

The pump 10 is driven by a commercially available propulsion induction motor 22, of a type which rotates at constant speed and is substantially unaffected by voltage changes up to ±10%.

The frequency of vibration of the tray 1 is controlled by varying the speed of rotation of the pump 10 in relation to the motor 22. The frequency of vibration is determined by the speed of the motor and the sizes of the pulleys 23 and 24. To determine the best operating frequency for any feeder made in accordance with this invention the following procedure is adopted.

An infinitely variable gear is attached to the hydraulic pump spindle and this is varied to determine the resonant frequency of the tray, i.e. the frequency at which maximum vibration is obtained for minimum amplitude or energy from the hydraulic pump. The speed of the pump is then measured at this point. The unit is then detuned by reducing the pump drive speed by approximately 10%. Then further fine adjustments are made to the rotational speed of the pump until the optimum speed is obtained, i.e. that at which the most uniform and consistent feeding is obtained by a series of test weights taken at various positions across the width of the distribution edge 5. The pump speed is then accurately measured and the drive arranged accordingly by providing pulleys 23 and 24 of appropriate size.

By means of the hydraulic system it is possible to "tune" the system with adjustment of the frequency in the manner described and to work at frequencies which are lower than the frequency of the local mains electricity supply.

The material is fed to the tray by means of two hoppers 25 and 26, the tray 1 itself being fed directly from the hopper 26, which is of relatively low capacity and which is reversely tapered so that the distal end (outlet) is wider than the mouth. A low capacity feed hopper 26 is necessary to ensure that all the contents of the hopper are on the move to prevent bridging. It also enables the variation of weight of the contents in the hopper and hence also the weight on the vibrating tray to be kept to a minimum. It is essential for accuracy of distribution that the variation in weight of the vibrating tray and its contents should be kept to a minimum since the sequence of the natural frequency of the vibrating tray and its contents is proportional to their mass. In this way clogging, caking and bridging of the granular material in the hopper 26 is considerably reduced. Where the apparatus is used for the supply of resinous material such a precaution is particularly necessary as such materials are prone to clumping and clogging.

The hopper 26 is secured to a frame member 27, which is rigidly secured to the frame 6 so as to isolate the hopper 26 from the vibrating tray 1. The outflow of granular material from the hopper 27 is controlled by an adjustable doctor blade 28, the vertical level of which is subject to fine adjustment by adjusting screws 29. The doctor blade 28 shown is a single unit with screw adjustment at each end but may equally well comprise a series of small sections with individual adjustment to enable compensation of any minor inaccuracies of feed onto the vibrating tray. Adjustment of the setting of the doctor blade together with adjustment of the amplitude control enables the delivery rates from the hopper to the tray to be varied over a considerable range.

The feed hopper 26 and the doctor blade 28 are rigidly suspended from the main support frame and are mechanically insulated from the vibrations of the tray. The tray itself is mechanically isolated from all other parts of the device with the exception of the piston of cylinder 11 by the torsion bushes 8 to prevent transmission of vibrations and consequent disturbance of the uniform flow of material.

To maintain a substantially constant and small mass of material in the hopper 26, the granular material is fed from a bulk storage hopper 25, which holds sufficient material for up to one hour, for example. The bulk hopper 25 is provided with a feed screw 30 and agitators 31 to feed the granular material to an oscillating sieve 32. The screw 30, agitators 31 and sieve 32 are driven from a motor 33, the sieve 32 being oscillated by means of a connecting rod 34, mounted on an eccentric 35.

The flow of material from the hopper 25 to the hopper 26 is controlled by means of a level control 36 which is built into the hopper 26 in such manner as to present no obstruction to the flow of material in the hopper. The level control 36 controls the motor 33 so as to feed material from the hopper 25 at the same rate as it is drawn off from the hopper 26 by the vibrating tray by increasing or decreasing the speed of the motor 33 to compensate for any departure of the level of the material 26 from a predetermined level.

Referring now to FIGURE 4, this illustrates the operation of the nucleonic thickness gauge 20 for automatic and continuous control of the amount of a coating applied to a fabric. The equipment used is Ekco-Electronics Ltd. indicator Type N.565A complete with auto-control unit Type N.604 using two Thalium 204 radioactive sources and two ionisation chambers. One source 50 and one chamber 52 are positioned respectively below and above a moving web of fabric at a position before application of a coating by the vibrating tray 1 and a source 51 and chamber 53 are positioned after application of the coating.

After initial calibration of the gauge using samples of coated and uncoated materials of known weights it will accurately maintain the coating weight between predetermined and preset limits by control of the bleed valve 18. This control is achieved by an output voltage from the N.604 unit which operates the servo-motor 19, rotating the bleed valve clockwise or anticlockwise, i.e. increasing or decreasing the amplitude of the vibrating tray, according to the magnitude of any error. This output or controlling voltage is applied automatically by the meter system for a time which is proportional to the error.

If a full scale error is indicated representing say 0.25 oz. a correcting signal will be applied for say 10 secs. If an error equivalent only to 0.1 oz. per square yard is indicated a correcting signal will be applied for $$\frac{0.1}{0.25} \times 10 = 4 \text{ secs.}$$

Figure 5:
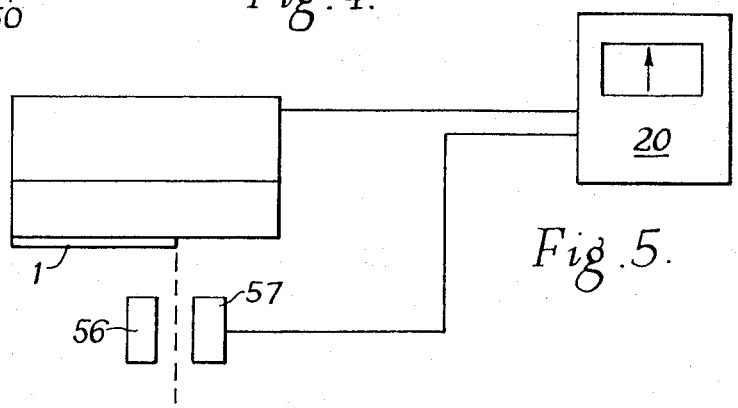
FIGURE 5 illustrates an alternative method of controlling the feed rate.

It is necessary to measure the material before and after coating only where appreciable variation in weight of the substrate occurs along its length. If the substrate does not vary in weight then a single radioactive source and measuring chamber can be used on the coated material measuring total weight.

Where the substrate variations are very large or where it may not be possible to have a measuring system on the substrate it is possible to control the vibratory feeder and hence the coating weight by measuring the curtain of resin particles as they fall from the tray, as illustrated in FIG. 5. Here a radioactive source 56 and ionisation chamber 57 are positioned on opposite sides of the curtain of particles falling from the tray 1 onto the substrate drawn beneath it. The method illustrated in FIGURE 4 is the preferred method of control because it takes account of variation of fabric speed.

*Example*

A feeder constructed in accordance with the description given above and substantially as illustrated in FIGURE 1 in which the feeder tray is 48″ long was used for distributing granulated polythene of a size which passes 36 BSS mesh and is retained on 50 BSS mesh over a web of cotton fabric moving horizontally beneath the feeder tray in a direction at right angles to the oblique feed edge of the feeder tray.

The amount of polythene discharged was tested by measurement at three positions along the oblique edge of the feeder tray at the centre, and at positions 3″ from the extremities, using nucleonic gauge equipment in a manner similar to that illustrated in FIGURE 5.

Ten measurements were made at each position for each of four selected amplitude settings of the vibrating tray designed to cover the entire range of amplitude of the tray. The maximum deviation in weight obtained is expressed below as a percentage of the average discharge of the feeder at any one amplitude setting.

| Amplitude Setting | Weight of material delivered over a 5″ square receptacle in 15 secs., gm. | Maximum percent deviation | Maximum percent deviation across the feeder |
|---|---|---|---|
| 1st | 14 | ±3.5 | ±6 |
| 2nd | 28 | ±2.5 | ±1.8 |
| 3rd | 45 | ±4.5 | ±3.0 |
| 4th | 92 | ±3 | ±4.9 |

The feeder was used to coat a web of cotton cloth travelling at controlled speeds up to 30 yards per minute with average overall weight deviations of less than ±5%. Check weighings were made on samples of the coated cloth across the width and along the length of the cloth over a run representing 10,000 yards of cloth with a single setting of amplitude. The deviations measured were less than ±5% at an average coating weight of 1.2 ozs. per square yard.

I claim:
1. A vibratory feeder for a granular material comprising a main frame, a substantially horizontal feed tray, a series of parallel links extending between said feed tray and said frame, said links lying at a small angle to the vertical, torsion bushings connecting said links to said tray and said frame to permit limited reciprocatory movement of said tray in relation to said frame, means coupled only to said tray for imparting vibratory pulses to said feed tray in one direction, the said torsion bushes constituting resilient means for moving said tray in the reverse direction in the interval between said vibratory pulses, and a low-capacity feed hopper positioned over said feed tray, the distal end of said hopper being close to the upper surface of said tray and a doctor blade associated with said feed hopper to control the rate at which granular material is drawn off from said hopper.

2. A vibratory feeder according to claim 1, further characterised in that the distal end of said hopper is wider than the mouth end.

3. A vibratory feeder according to claim 1, further including a bulk supply hopper for said granular material, means for feeding granular material from said bulk supply hopper to said feed hopper, and a level sensing controlling said feeding means associated with said feed hopper so as to maintain a substantially constant column of granular material in said feed hopper and supported on the vibrating tray.

4. A vibratory feed for a granular material comprising a main frame, a substantially horizontal feed tray, a series of spaced parallel links extending downwardly from said frame at a small angle to the vertical and suspending said tray from said frame, torsion bushings connecting said parallel links to said tray and said frame to permit at least a limited pivotal movement of said links in relation to said tray and said frame, a hydraulic cylinder coupled to said tray for imparting vibratory pulses to said feed tray in one direction to cause movement of particles of said granular material therealong, a reciprocating pump connected to said hydraulic cylinder, said pump being driven at substantially constant speed, control means coupled with said pump for varying its output at each stroke to permit control of the amplitude of the vibration of the feed tray, said torsion bushes serving as resilient means for moving said tray in the return direction in the interval between vibratory pulses, means for continuously determining the rate at which granular material is fed by said feed tray and means, coupled between said rate determining means and said control means, for adjusting the pump output to cancel out changes in feed rate.

References Cited by the Examiner
UNITED STATES PATENTS

| | | | |
|---|---|---|---|
| 2,125,046 | 7/1938 | Crandell | 259—2 |
| 3,007,454 | 11/1961 | Joelson | 121—164 |
| 3,028,053 | 4/1962 | Brown et al. | 222—55 |

FOREIGN PATENTS

| | | |
|---|---|---|
| 1,213,960 | 11/1959 | France. |
| 763,890 | 1/1954 | Germany. |

WALTER A. SCHEEL, *Primary Examiner.*

R. W. JENKINS, *Assistant Examiner.*